United States Patent [19]

Cosby

[11] 4,290,821
[45] Sep. 22, 1981

[54] TAPE CARTRIDGE STRAP CLEANING METHOD

[75] Inventor: Phillip A. Cosby, Arlington, Tex.

[73] Assignee: Graham Magnetics, Inc., North Richland Hills, Tex.

[21] Appl. No.: 125,622

[22] Filed: Feb. 28, 1980

Related U.S. Application Data

[62] Division of Ser. No. 948,704, Oct. 5, 1978, Pat. No. 4,123,223.

[51] Int. Cl.$^3$ ............................................. B08B 9/04
[52] U.S. Cl. ....................................... 134/8; 134/10; 134/21; 134/24
[58] Field of Search .................. 134/21, 8, 37, 24, 10, 134/6; 15/310, 311, 312 R, 345, 346, 304

[56] References Cited

U.S. PATENT DOCUMENTS

| | | | |
|---|---|---|---|
| 3,370,982 | 2/1968 | Hayunga | 15/346 |
| 3,733,639 | 5/1973 | Timia | 15/304 |
| 3,936,902 | 2/1976 | Shackleton et al. | 15/345 |
| 4,111,546 | 9/1978 | Maret | 15/345 |
| 4,213,223 | 7/1980 | Cosby | 15/304 |

FOREIGN PATENT DOCUMENTS 389034 10/1932 United Kingdom .................. 15/346

Primary Examiner—S. Leon Bashore
Assistant Examiner—Michael L. Goldman
Attorney, Agent, or Firm—Robert A. Cesari; John F. McKenna; Andrew F. Kehoe

[57] ABSTRACT

Method for cleaning generally cylindrical articles of irregular configuration and, particularly, for cleaning straps of the type used to hold magnetic tape and supplied by manufacturers for use with magnetic tapes. The method is performed by an apparatus which comprises exterior and interior nozzles resiliently mounted along the inside and outside of the cylinder, or ring, and form means to blow and suck dirt from the article being cleaned.

4 Claims, 5 Drawing Figures

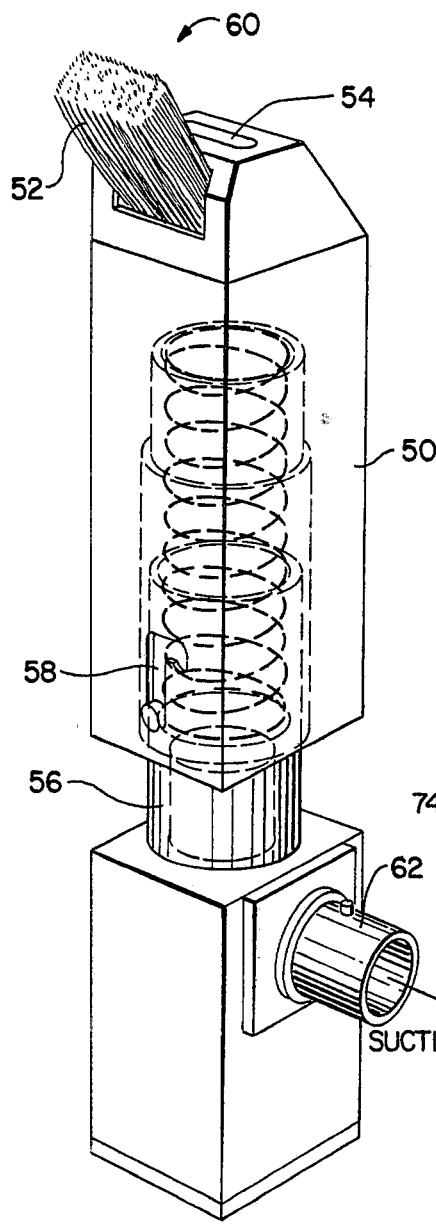
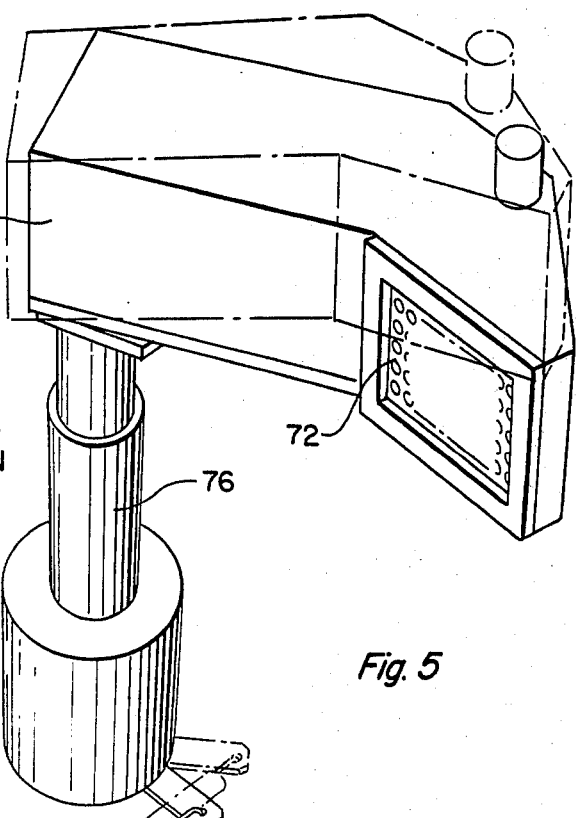
Fig. 4
Fig. 5

TAPE CARTRIDGE STRAP CLEANING METHOD

This is a division, of application Ser. No. 948,704 filed Oct. 5, 1978 now U.S. Pat. No. 4,123,223.

BACKGROUND OF THE INVENTION

This invention relates to an apparatus for dry cleaning of generally cylindrical articles of irregular configuration. The invention particularly relates to a means to clean so-called "easy load straps" which are used in conjunction with magnetic tapes to facilitate their handling and loading in read/write equipment. Such straps are ring shaped, normally comprise a channel and apertures therein to facilitate fluidic manipulation of the tape when it is mounted on, e.g., tape reading apparatus.

In the past, it has been generally known that it is desirable to clean magnetic tape from time to time and thereby to remove debris which can tend to accumulate thereon. Such debris, for example, can be dust or the result of buildup of abraded coatings on tape processing equipment. The buildup will, from time to time, fall onto the tape. Such cleaning is important where computerized records are stored on the tape. Very often, too, the cleaning is done contemporaneously with the inspection or recertification of second-hand tape.

Despite periodic cleaning and despite great care to avoid dust and other contamination on tape, there have been a number of sources of contamination that have remained substantial problems, albeit they may have not been so recognized in the prior art.

Among such sources of tape contamination have been the so-called easy-load straps, e.g., that sold under "Easyload I," by IBM. Some refer to such a strap as a "cartridge". Such straps are of molded plastic construction and handling and loading of reels of magnetic tape and have gained wide acceptance in the computer industry. However, debris from such straps is now believed to be a significant source of tape contamination and the inventor has set out to devise a practical means to free the straps of such contamination despite their complex shape and the number of orifices which provide potential sites for debris to become situated during a clearing operation.

SUMMARY OF THE INVENTION

It is a principle object of the invention to provide a process and means to clean articles which are generally cylindrical in shape but have irregular configurations along the generally cylindrical wall.

A further object of the invention is to provide a process and means to quickly and economically remove debris from apertured loading straps of the type used in handling and fluidic processing of magnetic tape.

Still another object of the invention will be obvious to those skilled in the art of their reading of this disclosure.

The above objects have been achieved by construction of apparatus that comprises a means to mount an empty easy-load tape strap, positive air supply means mounted for blowing air into one side of the strap, e.g., the exterior of a ring-shaped strap, and, at the same time, suction means for sucking the air from the interior side of the strap ring.

The suction means comprises a nozzle which advantageously rotates while the strap and external air nozzle are in fixed position.

In order to describe the invention as it relates to cleaning easy-load straps of the type used with magnetic tape, it is desirable to understand that such straps comprise an air channel whereby air is supplied to various apertures which are carefully positioned around the inside of the strap. This air is used to pick up the end of a magnetic tape and feed it to, for example, the magnetic reading equipment. It is not only important to keep this channel and these holes free of dirt, but it is important to keep fugitive dirt from being forced back into the channel through the holes by the cleaning implement during the cleaning operation. As will be seen, applicant not only keeps the requisite areas clean but advantageously utilizes the holes and channels in his cleaning process.

ILLUSTRATIVE EMBODIMENT OF THE INVENTION

In this application and accompanying drawings there is shown and described a perferred embodiment of the invention and suggested various alternatives and modifications thereof, but it is to be understood that these are not intended to be exhaustive and that other changes and modifications can be made within the scope of the invention. These suggestions herein are selected and included for purposes of illustration in order that others skilled in the art will more fully understand the invention and the principles thereof and will be able to modify it and embody it in a variety of forms, each as may be best suited in the condition of a particular case.

In the Drawings:

FIG. 4 is a perspective view of a vacuum cleaning brush construction of particular value in operating the apparatus of the invention.

FIG. 5 is a perspective view of an air-supplying nozzle useful in construction of the apparatus of the invention.

Figure 1:
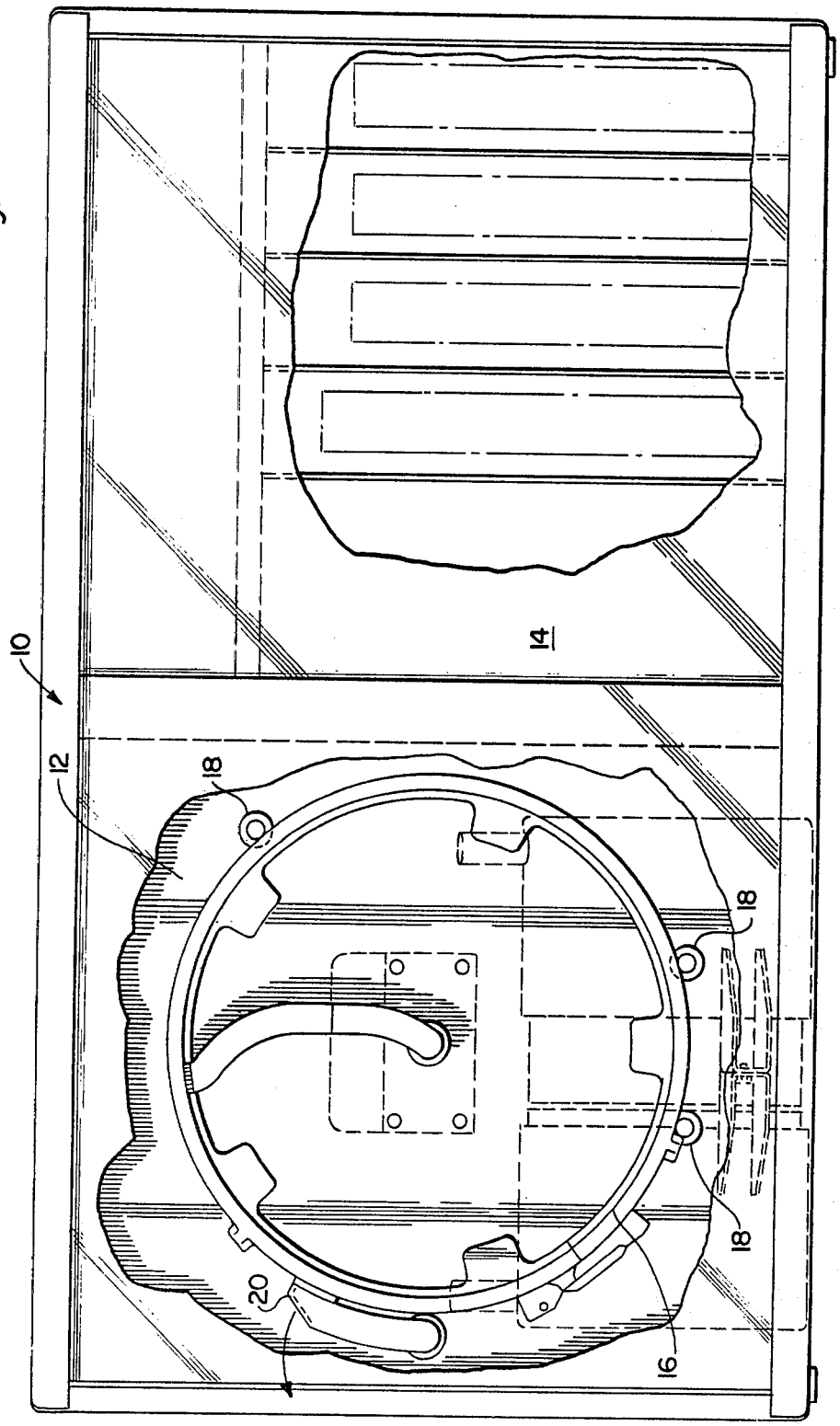
FIG. 1 is an elevation, from the front of an apparatus of the invention showing the general construction of the ring-cleaning apparatus.

Referring to FIG. 1, it is seen that cleaning apparatus 10 comprises a cleaning section 12 and a storage cabinet section 14 in easy-load strap 16 of the type used in the magnetic tape industry is shown mounted on a frame whereby it is positioned by 18 and, in part, an air-supply nozzle 20.

Figure 3:
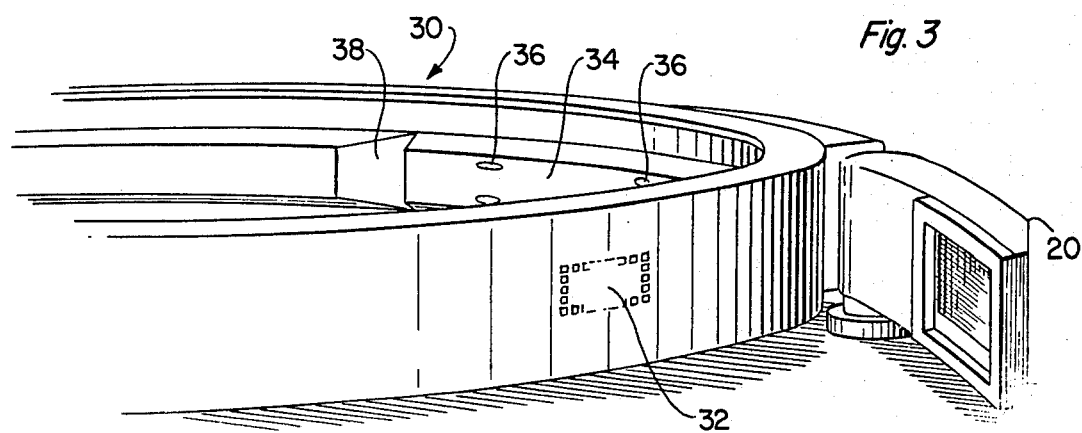
FIG. 3 illustrates a segment of a typical object to be cleaned indicating the air-accommodating passages therein.

FIG. 3 illustrates a segment 30 of the strap 16 showing a grid of external apertures 32 into which nozzle 20 is to supply air under pressure when the strap is mounted as is shown in FIG. 1. The air so supplied goes through a channel, the external configuration of which is shown at 34 within strap 16 and comes out of all of a series of apertures 36 internally spaced around the inner periphery of strap 16.

Figure 2:
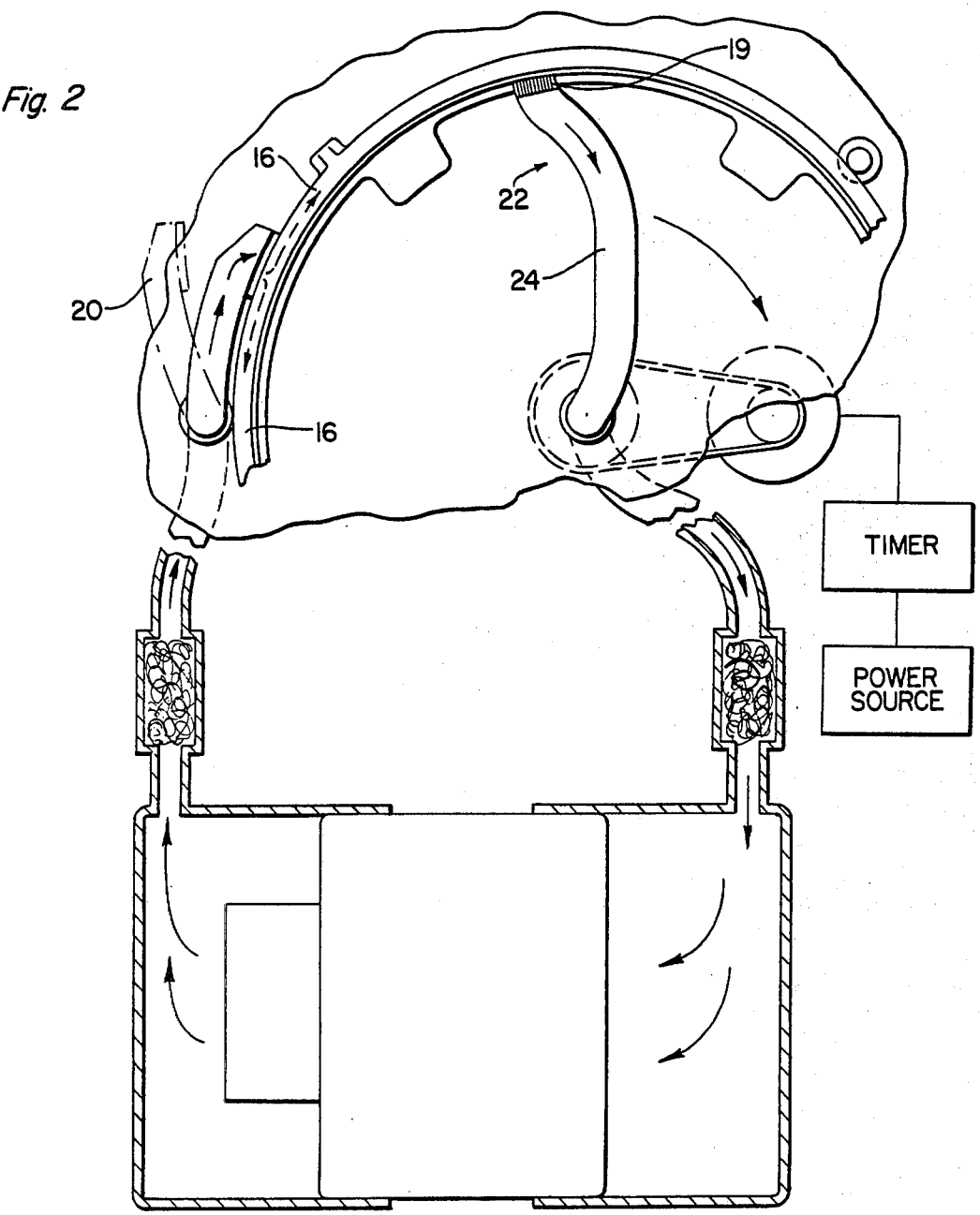
FIG. 2 is a somewhat schematic diagram showing the pneumatic flow-scheme associated with the ring-cleaning apparatus.

As is shown in FIG. 2, channel 34 is represented by an annular conduit 23 which is integrally molded into strap 16.

Both air-supply nozzle 20 and the strap 16 are in fixed position during the illustrated cleaning operation. However, an internally-mounted suction cleaner 22 comprising a brush 19 and a suction conduit 24 is rotated at about 18 rpm within the ring formed by strap 16. The brush-bearing vacuum head of cleaner 22 is mounted for biased contact with the interior wall of the ring even at those irregularities and discontinuities as shown in FIG. 3 at 38.

FIG. 2 further illustrates how air sucked through suction-cleaning means 8 is carried via conduit 20 and conduit 21 through a filter 26 back to the intake of a fan 28. Hence, the air moves through the fan 28 back into a pre-filter 40 in conduit 42 and thence to air-supply nozzle which acts as the positive pressure supply means to apertures 32.

Referring to FIG. 4, it will be seen that a suction nozzle according to the invention will comprise a cleaner head 50 comprising a brush 52 and suction nozzle slot 54. Head 50 is biased for reciprocal movement over an integral sleeve and vacuum conduit member 56 by a spring member 58 positioned between members 50 and 56 and bearing against each of them. The brush is preferably contoured, as shown in 60, to allow for less wear and friction on channel 34. Extending from member 56 is an air conduit extension arm 62 which directs the suction through the face plate of apparatus 10 and thence to the vacuum pump.

FIG. 5 illustrates a typical pressure supply nozzle 70 which comprises a series of air-outlet apertures 72 and a nozzle head member 74. Head 74 is mounted for rotation on a shaft 76 which extends from below the faceplate of the apparatus and is held by a spring means 78 which normally pulls the head member 74 into air-supply position with the aperture 32 shown in FIG. 3, but is readily extended to facilitate positioning of the strap.

A dual purpose vacuum motor blower such as that sold under the trade designation Model 115250 by Lamb Electric Division of AMETEK is suitable for use.

A door 17 is adapted to slide over the strap thereby forming a closed cleaning chamber through which the cleaning air may be circulated with relatively little contamination of, or leakage into, the environment of the strap cleaning apparatus.

It is also to be understood that the following claims are intended to cover all of the generic and specific features of the invention herein described and all statements of the scope of the invention which might be said to fall therebetween.

What is claimed is:

1. A process for cleaning interior walls of a ring-like strap of the type used to hold and release magnetic tape for fluidic feeding in tape-reading apparatus, the strap comprising an annular conduit between interior and exterior walls of said strap, said conduit terminating in spaced apertures in said interior wall thereof, said process comprising the steps of
   (a) supplying the air through said exterior wall under pressure into said annular conduit to maintain positive air-streams coming out of said apertures in said interior wall and, thereby, preventing dirt in interior walls from being forced into said apertures while
   (b) carrying out a relative rotation between (1) a suction-cleaning means mounted in biased contact with said interior wall and (2) the interior wall of said strap.

2. A process as defined in claim 1 wherein said relative rotation is carried out at about 10 to 30 revolutions per minute.

3. A process as defined in claim 1 wherein said cleaning means is a brush held in biased contact with said interior wall of said strap.

4. A process as defined in claim 1 or 2 wherein said air is recirculated in a closed air circulation system and is filtered both when it is under pressure before it is supplied into said passage and when it is being sucked from the interior wall of said strap.

* * * * *

UNITED STATES PATENT AND TRADEMARK OFFICE
CERTIFICATE OF CORRECTION

PATENT NO. : 4,290,821

DATED : September 22, 1981

INVENTOR(S) : Phillip A. Cosby

It is certified that error appears in the above-identified patent and that said Letters Patent are hereby corrected as shown below:

Column 2, line 50 - change "positioned by 18" to --positioned by position pins 18--.

Signed and Sealed this

Eighth Day of December 1981

[SEAL]

Attest:

GERALD J. MOSSINGHOFF

Attesting Officer — Commissioner of Patents and Trademarks